March 26, 1935. J. BASIL ET AL 1,995,763

SAFETY DEVICE FOR POWER PRESSES

Filed Jan. 18, 1934

INVENTORS
JOSEPH BASIL
LOUIS ROSSETTI.
BY
ATTORNEYS

Patented Mar. 26, 1935

1,995,763

UNITED STATES PATENT OFFICE 1,995,763

SAFETY DEVICE FOR POWER PRESSES

Joseph Basil and Louis Rossetti, Detroit, Mich.

Application January 18, 1934, Serial No. 707,075

3 Claims. (Cl. 192—130)

This invention relates to a safety device for preventing the inadvertent operation of a power operated press or other similar machine, such machines usually embodying a clutch which is thrown into operative position to start the machine by a foot pedal or hand operated device; and an object of the present invention is to provide means whereby the machine is prevented from being started by an inadvertent operation of the foot pedal or other control device.

A further object is to provide electrically controlled means for preventing the inadvertent operation of the clutch of the machine, said electrically controlled device including a push button or other switch device to be operated by the hand of the operator so that his hand will be employed during the operation of the machine and prevent his accidentally getting his hand within the path of the operated parts of the machine.

It is also an object of the present invention to provide an arrangement whereby the machine is held inoperative at all times except when the push button switch is operated, thus preventing the inadvertent operation of the machine by an inadvertent operation of the foot pedal or other control device.

A further object is to provide a very simple and compact device for the purpose which is efficient in its operation and not liable to get out of order, and to provide certain other new and useful features in the particular construction and arrangement of parts, all as hereinafter more fully set forth and as disclosed in the accompanying drawing, wherein—

Figure 1:
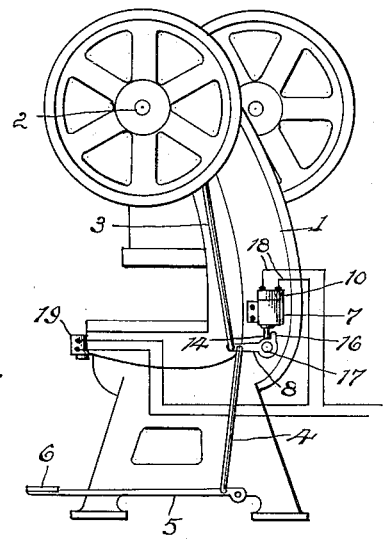
Figure 1 is a side elevation of the machine showing a control device illustrative of the present invention applied thereto.

In the accompanying drawing the machine to which the control device embodying the present invention is applied, is indicated as a whole by the numeral 1 and this machine is provided at its upper end with a transverse shaft 2 to which is secured the usual clutch for connecting and disconnecting the power operated mechanism to drive the machine, this clutch not being shown nor is the manner of its operation or the means whereby it is operated, shown in the drawing, as such mechanism is old and well known as applied to machines of this character. The only part of the clutch operating mechanism which is shown, is a rod 3 which is connected in the usual manner at its upper end to the clutch mechanism to operate the same by a downward pull upon this rod.

This rod 3 for operating the clutch is, as shown, usually connected at its lower end to a lever pivotally supported upon the frame of the machine, and to this lever is pivotally attached at one end a like rod 4 extending downward to a pivotal connection with a foot pedal 5 which is pivoted at one end to the frame of the machine with the rod 4 connected to said pedal lever intermediate the pivot of said lever and the end thereof which is provided with an end member 6 adapted to be engaged by the foot of the operator to swing the lever 5 and by a downward pull on the rods 3 and 4, operate the clutch to start the machine.

The safety device embodying the present invention consists of a guide bracket 7 adapted to be secured to the frame of the machine adjacent the lever 8 to which the rods 3 and 4 are pivotally attached, and mounted upon this bracket 7 is a solenoid 9 within a suitable casing 10. This solenoid is provided with an axial tubular guide sleeve 11 for guiding a plunger 12 so that upon energization of the solenoid, the plunger will be drawn inwardly or upwardly into the solenoid, said plunger being pivotally connected at 13 to a second plunger or suitable member 14 which is guided within a bearing 15 in the lower end of the bracket 7. This stop member 14 projects from the lower end of the bracket into the path of a stop lug 16 on the lever 8, which lever is pivoted at 17 in the vertical plane of the axis of the stop 14. Therefore, when the solenoid is deenergized the stop member 14 will move in an endwise direction downwardly into engagement with the hub of the lever 8 which is pivoted at 17 and into the path of the stop lug 16.

Should the foot pedal 6 be inadvertently depressed either by the operator or by the engagement therewith of a passing truck or other device, the machine will not be operated because the downward pull of the foot pedal upon the rods 3 and 4 cannot rotate the lever 8 due to the fact that the stop member 14 is within the path of the stop lug 16.

When the operator wishes to start the machine, it is necessary to raise the stop member 14 out of the path of the lug 16, and to do this, he will energize the solenoid 9 by energizing the circuit 18 thereof through the medium of a switch 19 placed in a convenient position at the front of the table of the machine, this switch preferably being in the form of a push buton. With one hand the operator will place the work upon the worktable of the machine and with his other hand will operate the push button 19, thus energizing the solenoid 9 to raise the stop member 14, and he will then place his foot upon the pedal 6 to operate the clutch and start the machine.

Figure 2:
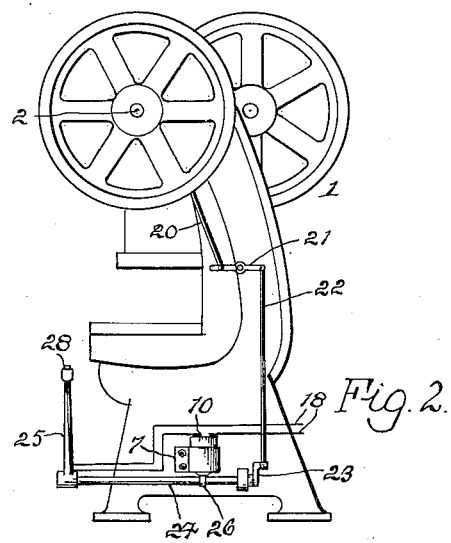
Fig. 2 is a side elevation of a similar machine showing a modified construction and arrangement of control device applied thereto.
Figure 3:
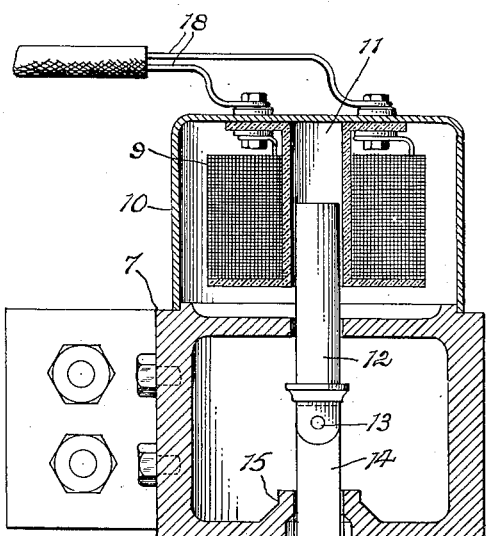
Fig. 3 is an enlarged detail of the control device, showing the same partly in vertical section.
Figure 4:
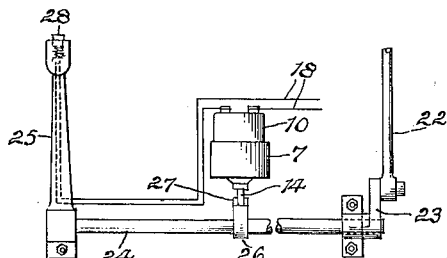
Fig. 4 is a detail showing the application of the control device shown in Figure 2.
Figure 5:
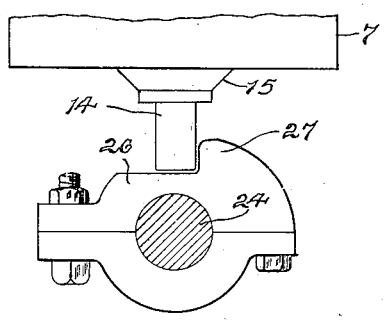
Fig. 5 is an enlarged detail of the stop device shown in Fig. 4 and showing the shaft to which such device is applied, in transverse section.

In Figures 2, 4 and 5 of the drawing, an arrangement of the safety device is shown as applied to a machine where the clutch of the machine is arranged to be operated by a rod 20 connected to the clutch mechanism at one end and at its opposite end to one end of a lever 21 which is pivoted intermediate its ends to the frame of the machine and to the opposite end of which a second rod 22 is pivotally connected, said second rod extending downward with its lower end operatively connected to a crank 23 upon the end of a horizontal shaft 24 mounted in suitable bearings upon the base of the machine adjacent the floor with its forwardly projecting end provided with a hand lever 25 by means of which the shaft 24 may be rotated to rotate the crank 23 and operate the clutch through the medium of the rods 20 and 22.

Secured to this shaft 24 is a stop collar 26 and this stop collar is provided with a stop lug 27 into the path of movement of which the stop plunger 14 is positioned, this plunger being carried, as previously described, by a bracket 7 on the frame of the machine, with the stop plunger operated by means of the solenoid 9 housed within the casing 10.

To energize the solenoid and thus raise the stop plunger 14 out of the path of the lug 27 so that the shaft 24 may be rotated by means of the handle 25, the circuit 18 of this solenoid is energized through the operation of a push button 28 carried by the hand grip portion of the hand lever 25.

With this arrangement the shaft 24 may be rotated by the hand lever 25 to operate the clutch and start the machine, only when the solenoid has been energized by operating the push button 28. Therefore, normally the machine is prevented by the stop member 14 from being operated accidentally as by the hand lever being accidentally swung by another person than he who is operating the machine, or by a passing truck or the like, as the stop member is always within the path of the stop lug 27 except when the push button on the upper end of the handle is intentionally operated and the hand lever thereafter intentionally swung.

With this construction and arrangement of safety device accidents are effectually prevented and the device is simple in construction, may be quickly installed and is sure and efficient in its operation, the bracket 7 for supporting the solenoid being rigidly attached to the frame of the machine where it is out of the way and not liable to be knocked off or the solenoid injured, and by the arrangement of this stop mechanism the same may be readily applied to machines as ordinarily constructed to prevent accidents through the inadvertent operation of the foot pedal or hand lever.

Obviously changes may be made in the construction and arrangement to suit the particular conditions of installation and other changes may be made within the scope of the appended claims without departing from the spirit of the invention, and we do not therefore wish to limit ourselves to the particular construction shown.

Having thus fully described our invention, what we claim is:—

1. Means of the character described for application to control mechanism of power operated machines, said means including a pivotally supported member operatively connected to said mechanism to be rotated thereby, a vertically arranged longitudinally movable stop member freely movable in one direction by gravity and located above said pivoted member to engage said member, and a solenoid for moving said stop member longitudinally against the action of gravity.

2. A safety device for power operated machines, said means including a pivotally supported member operatively connected to the control mechanism for said machine to be rotated thereby, said member having an upwardly extending stop lug, a vertically arranged longitudinally reciprocable stop member above said pivoted member and adapted to be projected into the path of said lug by gravity, a solenoid surrounding said stop member to lift the same out of the path of said lug against the action of gravity, and a hand operated switch to close the circuit of said solenoid.

3. A safety device for power operated machines including manually operated control mechanism, said device including a pivotally supported member operatively connected to said control mechanism to be rotated thereby, said member including a laterally and upwardly extending stop lug arranged eccentrically of said pivoted support of said member, a longitudinally reciprocable stop member supported in a vertical position in the vertical plane of said pivotally supported member and vertically above the axis of the pivotal support of said member and freely movable by gravity into contact therewith in the path of movement of said lug, a solenoid surrounding the upper end of said stop member to lift the same out of the path of said lug, a bracket forming a guide for said stop member and a support for said solenoid, an electric circuit in which said solenoid is connected, and a manually operable switch in said circuit.

JOSEPH BASIL.
LOUIS ROSSETTI.